US00RE51054E

(19) United States
(12) Reissued Patent
Wang et al.

(10) Patent Number: US RE51,054 E
(45) Date of Reissued Patent: Oct. 6, 2026

(54) INFLATING MODULE FOR USE WITH AN INFLATABLE OBJECT

(71) Applicant: Team Worldwide Corp., Taipei City (TW)

(72) Inventors: Cheng-Chung Wang, Taipei City (TW); Chien-Hua Wang, Taipei City (TW)

(73) Assignee: Team Worldwide Corp., Taipei City (TW)

(21) Appl. No.: 16/894,242

(22) Filed: Jun. 5, 2020

Related U.S. Patent Documents

Reissue of:
(64) Patent No.: 9,989,979
Issued: Jun. 5, 2018
Appl. No.: 14/474,073
Filed: Aug. 29, 2014

U.S. Applications:
(63) Continuation of application No. 13/112,847, filed on May 20, 2011, now Pat. No. 8,863,771.

(30) Foreign Application Priority Data

May 21, 2010 (CN) ..... 201010186302.4

(51) Int. Cl.
*G05D 16/16* (2006.01)
*E03B 5/00* (2006.01)
(Continued)

(52) U.S. Cl.
CPC ..... *G05D 16/16* (2013.01); *F04B 1/00* (2013.01); *F04B 39/0027* (2013.01);
(Continued)

(58) Field of Classification Search
CPC ..... G05D 16/16; F04D 25/084; F04D 29/503; F04D 25/166; Y10T 137/36;
(Continued)

(56) References Cited

U.S. PATENT DOCUMENTS 2,257,862 A * 10/1941 Sarver ..... F04B 45/022 417/338
4,170,439 A * 10/1979 Hase ..... F04B 45/027 417/413.1
(Continued)

OTHER PUBLICATIONS

"Final Written Decision", *Intex Recreation Corp.* v. *Team Worldwide Corp.*, US Patent Trial and Appeal Board, PGR-2019-00015, U.S. Pat. No. 9,989,979 B2, (Apr. 29, 2020), 76 pgs.
(Continued)

*Primary Examiner* — William C Doerrler
(74) *Attorney, Agent, or Firm* — Schwegman Lundberg & Woessner, P.A.

(57) ABSTRACT

An inflating module adapted to an inflatable object includes a pressure controlling assembly configured to monitor air pressure in the inflatable object after the inflatable body has been inflated and a supplemental air pressure providing device. The pressure controlling assembly is configured to automatically activate the supplemental air pressure providing device when the air pressure inside the inflatable object decreases below a predetermined threshold after inflation, and to control the supplemental air pressure providing device to provide supplemental air pressure to the inflatable object so as to maintain the air pressure of the inflatable object within a predetermined range.

19 Claims, 10 Drawing Sheets

(51) Int. Cl.

| | |
|---|---|
| ***F04B 1/00*** | (2020.01) |
| ***F04B 39/00*** | (2006.01) |
| ***F04D 25/08*** | (2006.01) |
| ***F04D 25/16*** | (2006.01) |
| ***F04D 29/50*** | (2006.01) |

(52) U.S. Cl.

CPC ..... *F04D 25/084* (2013.01); *F04D 25/166* (2013.01); *F04D 29/503* (2013.01); *Y10T 137/36* (2015.04); *Y10T 137/85994* (2015.04); *Y10T 137/86035* (2015.04)

(58) Field of Classification Search

CPC ..... Y10T 137/85994; Y10T 137/86035; F04B 1/00; F04B 39/0027

See application file for complete search history.

(56) References Cited

U.S. PATENT DOCUMENTS 4,585,397 A * 4/1986 Crawford ..... F04B 43/09 310/13
4,655,497 A * 4/1987 Mallett ..... B62J 17/02 296/78.1
5,020,176 A * 6/1991 Dotson ..... A47C 27/082 137/487.5
5,325,551 A * 7/1994 Tappel ..... A47C 27/082 5/709
5,418,339 A * 5/1995 Bowen et al. ..... 181/230
5,588,811 A * 12/1996 Price ..... A47C 20/048 417/350
5,716,199 A 2/1998 Shan-Chieh
6,069,423 A * 5/2000 Miller et al. ..... 310/51
6,168,392 B1 * 1/2001 Takano ..... A01K 63/047 417/312
6,717,299 B2 * 4/2004 Bacile et al. ..... 310/51
6,721,980 B1 4/2004 Price et al.
7,365,277 B2 4/2008 Wang
7,434,283 B2 10/2008 Wilkinson
7,475,443 B2 * 1/2009 Wang ..... 5/713
7,647,662 B2 1/2010 Wang
7,739,763 B2 * 6/2010 Wang et al. ..... 5/710
7,789,194 B2 9/2010 Lathrop et al.
8,033,797 B2 * 10/2011 Kehrmann et al. ..... 417/44.9
8,151,390 B2 4/2012 Wang et al.
8,297,309 B2 * 10/2012 Wang ..... 137/565.15
8,480,382 B2 * 7/2013 Wang ..... F04B 17/042 318/123
8,801,392 B2 8/2014 Wang et al.
8,863,771 B2 * 10/2014 Wang et al. ..... 137/565.17
9,062,668 B2 6/2015 Wang et al.
9,157,433 B2 10/2015 Wang et al.
2002/0175573 A1 * 11/2002 Hayashi ..... 310/54
2002/0194678 A1 * 12/2002 Chung ..... F04D 25/084 5/713
2004/0007302 A1 * 1/2004 Hamilton ..... B60C 23/041 152/416
2005/0238512 A1 * 10/2005 Luharuka ..... F04B 9/02 417/437
2007/0094806 A1 * 5/2007 Beretta ..... A47C 27/082 5/713
2008/0109962 A1 * 5/2008 Wang et al. ..... 5/710
2008/0109963 A1 * 5/2008 Wang et al. ..... 5/710
2008/0286117 A1 * 11/2008 Kehrmann et al. ..... 417/1
2009/0089935 A1 * 4/2009 Wang ..... H01H 35/2614 5/713
2010/0024939 A1 * 2/2010 Kusunoki ..... B60C 23/0408 152/416
2010/0286597 A1 * 11/2010 Wang ..... F04B 43/026 604/35
2011/0020149 A1 * 1/2011 Tsai ..... 417/321
2012/0053519 A1 * 3/2012 Wang ..... A61M 3/0258 604/131
2014/0023518 A1 * 1/2014 O'Brien ..... B60C 23/12 152/415
2015/0306923 A1 * 10/2015 Jung ..... B60S 5/046 152/416

OTHER PUBLICATIONS

"Petition for Post Grant Review of U.S. Pat. No. 9,989,979", *Intex Recreation Corp.* v. *Team Worldwide Corp.*, US Patent Trial and Appeal Board, PGR2019-00015, (Nov. 12, 2018), 104 pgs.

"Appellant Team Worldwide Corporation's Unopposed Motion to Extend Time to File Principal Brief (Document: 9)", *Team Worldwide Corporation* v. *Intex Recreation Corp.*, Fed. Cir. Case No. 20-1975, (Sep. 21, 2020), 12 pgs.

"Appellee Intex Recreation Corp.'s Certificate of Compliance with Federal Circuit Rule 25.1(C)(2)(A)", *Team Worldwide Corporation* v. *Intex Recreation Corp.*, Fed. Cir. Case No. 20-1975, (Mar. 29, 2021), 3 pgs.

"Appellee Intex Recreation Corp.'s Unopposed Motion for Extension of Time to File Response Brief (Document: 15-1)", *Team Worldwide Corporation* v. *Intex Recreation Corp.*, Fed. Cir. Case No. 20-1975, (Dec. 23, 2020), 12 pgs.

"Brief of Appellant (Document: 12)", *Team Worldwide Corporation* v. *Intex Recreation Corp.*, Fed. Cir. Case No. 20-1975, (Dec. 11, 2020), 164 pgs.

"Certificate of Interest (Document: 3)", *Team Worldwide Corporation* v. *Intex Recreation Corp.*, Fed. Cir. Case No. 20-1975, (Jul. 23, 2020), 3 pgs.

"Certificate of Interest (Document: 6)", *Team Worldwide Corporation* v. *Intex Recreation Corp.*, Fed. Cir. Case No. 20-1975, (Jul. 23, 2020), 3 pgs.

"Corrected Brief of Appellant (Document: 14)", *Team Worldwide Corporation* v. *Intex Recreation Corp.*, Fed. Cir. Case No. 20-1975, (Dec. 21, 2020), 164 pgs.

"Docketing Statement (Document: 7)", *Team Worldwide Corporation* v. *Intex Recreation Corp.*, Fed. Cir. Case No. 20-1975, (Jul. 23, 2020), 2 pgs.

"Entry of Appearance (Document: 2)", *Team Worldwide Corporation* v. *Intex Recreation Corp.*, Fed. Cir. Case No. 20-1975, (Jul. 23, 2020), 2 pgs.

"Entry of Appearance (Document: 5)", *Team Worldwide Corporation* v. *Intex Recreation Corp.*, Fed Cir. Case No. 20-1975, (Jul. 23, 2020), 2 pgs.

"General Docket", *Team Worldwide Corporation* v. *Intex Recreation Corp.*, Fed Cir. Case No. 20-1975, (Jul. 9, 2020), 6 pgs.

"Joint Appendix vol. I of II (Document 21-1)", *Team Worldwide Corporation* v. *Intex Recreation Corp.*, Fed. Cir. Case No. 20-1975, (Mar. 29, 2021), 492 pgs.

"Joint Appendix vol. II of II (Document 21-2)", *Team Worldwide Corporation* v. *Intex Recreation Corp.*, Fed. Cir. Case No. 20-1975, (Mar. 29, 2021), 504 pgs.

"Joint Statement of Compliance with Federal Circuit Rule 33(a) (Document: 20)", *Team Worldwide Corporation* v. *Intex Recreation Corp.*, Fed. Cir. Case No. 20-1975, (Mar. 29, 2021), 3 pgs.

"Notice Forwarding Certified List (Document: 8)", *Team Worldwide Corporation* v. *Intex Recreation Corp.*, Fed. Cir. Case No. 20-1975, Proceeding No. PGR2019-00015, (Aug. 13, 2020), 130 pgs.

"Notice of Docketing (Document: 1-1)", *Team Worldwide Corporation* v. *Intex Recreation Corp.*, Fed. Cir. Docket No. 2020-1975, (Dec. 9, 2020), 88 pgs.

"Notice of Non-Compliance (Document: 13)", *Team Worldwide Corporation* v. *Intex Recreation Corp.*, Fed. Cir. Case No. 20-1975, (Dec. 17, 2020), 1 pg.

"Notice of Telephonic Oral Argument (Document: 32)", *Team Worldwide Corporation* v. *Intex Recreation Corp.*, Fed. Cir. Case No. 20-1975, (Apr. 21, 2021), 1 pg.

"Notice to Advise of Scheduling Conflicts of Arguing Counsel (Document: 23)", *Team Worldwide Corporation* v. *Intex Recreation Corp.*, Fed. Cir. Case No. 20-1975, (Mar. 31, 2021), 1 pg.

(56) References Cited

OTHER PUBLICATIONS

"Patent Owner's Notice of Appeal", *Intex Recreation Corp.* v. *Team Worldwide Corp.*, US Patent Trial and Appeal Board, Case: PGR2019-00015, U.S. Pat. No. 9,989,979, (Jun. 29, 2020), 84 pgs.
"Reply Brief (Document: 18)", *Team Worldwide Corporation* v. *Intex Recreation Corp.*, Fed. Cir. Case No. 20-1975, (Mar. 22, 2021), 35 pgs.
"Response Brief of Appellee Intex Recreation Corp. (Document: 17)", *Team Worldwide Corporation* v. *Intex Recreation Corp.*, Fed. Cir. Case No. 20-1975, (Mar. 1, 2021), 74 pgs.
"Response to Notice of Oral Argument (Document: 33)", *Team Worldwide Corporation* v. *Intex Recreation Corp.*, Fed. Cir. Case No. 20-1975, (May 17, 2021), 1 pg.
"Response to Notice of Oral Argument (Document: 34)", *Team Worldwide Corporation* v. *Intex Recreation Corp.*, Fed. Cir. Case No. 20-1975, (May 17, 2021), 1 pg.
"Response to Notice to Advise of Scheduling Conflicts (Document: 26)", *Team Worldwide Corporation* v. *Intex Recreation Corp.*, Fed. Cir. Case No. 20-1975, (Apr. 7, 2021), 3 pgs.
"Response to Notice to Advise of Scheduling Conflicts (Document: 27)", *Team Worldwide Corporation* v. *Intex Recreation Corp.*, Fed. Cir. Case No. 20-1975, (Apr. 7, 2021), 3 pgs.
"Corrected Certificate of Service in the PTAB Trial", *Intex Recreation Corp., Bestway (USA) Inc.*, v. *Team Worldwide Corporation*, PGR2019-00015, (Jun. 29, 2020), 1 pg.
"Decision Denying Institution of Inter Partes Review", *Intex Recreation Corp.* v. *Team Worldwide Corporation*, IPR2019-00245, (May 15, 2019), 12 pgs.
"Decision Denying Institution of Inter Partes Review", *Intex Recreation Corp.* v. *Team Worldwide Corporation*, IPR2019-00243, (May 8, 2019), 27 pgs.
"Decision Denying Institution of Inter Partes Review", *Intex Recreation Corp.* v. *Team Worldwide Corporation*, IPR2019-00244, (May 8, 2019), 23 pgs.
"Exhibit 1001: U.S. Pat. No. 8,863,771 B2", *Intex Recreation Corp.* v. *Team Worldwide Corporation*, IPR2019-00243, (Nov. 12, 2018), 15 pgs.
"Exhibit 1001: U.S. Pat. No. 8,863,771 B2", *Intex Recreation Corp.* v. *Team Worldwide Corporation*, IPR2019-00245, (Nov. 12, 2018), 15 pgs.
"Exhibit 1002: Expert Declaration of Bernhard Kuchel", *Intex Recreation Corp.* v. *Team Worldwide Corporation*, IPR2019-00243, (Nov. 12, 2018), 116 pgs.
"Exhibit 1002: Expert Declaration of Bernhard Kuchel", *Intex Recreation Corp.* v. *Team Worldwide Corporation*, IPR2019-00245, (Nov. 12, 2018), 83 pgs.
"Exhibit 1003: File History for U.S. Pat. No. 8,863,771 B2", *Intex Recreation Corp.* v. *Team Worldwide Corporation*, IPR2019-00243, (Nov. 12, 2018), 261 pgs.
"Exhibit 1003: File History for U.S. Pat. No. 8,863,771 B2", *Intex Recreation Corp.* v. *Team Worldwide Corporation*, IPR2019-00245, (Nov. 12, 2018), 261 pgs.
"Exhibit 1004: U.S. Pat. No. 9,989,979 B2", *Intex Recreation Corp.* v. *Team Worldwide Corporation*, IPR2019-00243, (Nov. 12, 2018), 16 pgs.
"Exhibit 1004: U.S. Pat. No. 9,989,979 B2", *Intex Recreation Corp.* v. *Team Worldwide Corporation*, IPR2019-00245, (Nov. 12, 2018), 16 pgs.
"Exhibit 1005: File History for U.S. Pat. No. 9,989,979 B2", *Intex Recreation Corp.* v. *Team Worldwide Corporation*, IPR2019-00245, (Nov. 12, 2018), 365 pgs.
"Exhibit 1005: File History for U.S. Pat. No. 9,989,979 B2", *Intex Recreation Corp.* v. *Team Worldwide Corporation*, IPR2019-00243, (Nov. 12, 2018), 365 pgs.
"Exhibit 1006: U.S. Pat. No. 6,721,980 B1", *Intex Recreation Corp.* v. *Team Worldwide Corporation*, IPR2019-00243, (Nov. 12, 2018), 21 pgs.
"Exhibit 1006: U.S. Pat. No. 6,721,980 B1", *Intex Recreation Corp.* v. *Team Worldwide Corporation*, IPR2019-00245, (Nov. 12, 2018), 21 pgs.
"Exhibit 1007: U.S. Pat. No. 7,789,194 B2", *Intex Recreation Corp.* v. *Team Worldwide Corporation*, IPR2019-00245, (Nov. 12, 2018), 22 pgs.
"Exhibit 1007: U.S. Pat. No. 7,789,194 B2", *Intex Recreation Corp.* v. *Team Worldwide Corporation*, IPR2019-00243, (Nov. 12, 2018), 22 pgs.
"Exhibit 1008: U.S. Pat. No. 5,716,199 A", *Intex Recreation Corp.* v. *Team Worldwide Corporation*, IPR2019-00243, (Nov. 12, 2018), 9 pgs.
"Exhibit 1008: U.S. Pat. No. 5,716,199 A", *Intex Recreation Corp.* v. *Team Worldwide Corporation*, IPR2019-00245, (Nov. 12, 2018), 9 pgs.
"Exhibit 1009: U.S. Pat. No. 7,434,283 B2", *Intex Recreation Corp.* v. *Team Worldwide Corporation*, IPR2019-00245, (Nov. 12, 2018), 25 pgs.
"Exhibit 1009: U.S. Pat. No. 7,434,283 B2", *Intex Recreation Corp.* v. *Team Worldwide Corporation*, IPR2019-00243, (Nov. 12, 2018), 25 pgs.
"Exhibit 1010: U.S. Pat. No. 6,928,681 B1", *Intex Recreation Corp.* v. *Team Worldwide Corporation*, IPR2019-00243, (Nov. 12, 2018), 7 pgs.
"Exhibit 1010: U.S. Pat. No. 6,928,681 B1", *Intex Recreation Corp.* v. *Team Worldwide Corporation*, IPR2019-00245, (Nov. 12, 2018), 7 pgs.
"Exhibit 1011: U.S. Pat. No. 4,829,616", *Intex Recreation Corp.* v. *Team Worldwide Corporation*, IPR2019-00245, (Nov. 12, 2018), 24 pgs.
"Exhibit 1011: U.S. Pat. No. 4,829,616", *Intex Recreation Corp.* v. *Team Worldwide Corporation*, IPR2019-00243, (Nov. 12, 2018), 24 pgs.
"Exhibit 1012: U.S. Pat. No. 4,224,706", *Intex Recreation Corp.* v. *Team Worldwide Corporation*, IPR2019-00243, (Nov. 12, 2018), 8 pgs.
"Exhibit 1012: U.S. Pat. No. 4,224,706", *Intex Recreation Corp.* v. *Team Worldwide Corporation*, IPR2019-00245, (Nov. 12, 2018), 8 pgs.
"Exhibit 1013: U.S. Pat. No. 4,768,249", *Intex Recreation Corp.* v. *Team Worldwide Corporation*, IPR2019-00245, (Nov. 12, 2018), 28 pgs.
"Exhibit 1013: U.S. Pat. No. 4,768,249", *Intex Recreation Corp.* v. *Team Worldwide Corporation*, IPR2019-00243, (Nov. 12, 2018), 28 pgs.
"Exhibit 1014: U.S. Pat. No. 5,509,154", *Intex Recreation Corp.* v. *Team Worldwide Corporation*, IPR2019-00243, (Nov. 12, 2018), 29 pgs.
"Exhibit 1014: U.S. Pat. No. 5,509,154", *Intex Recreation Corp.* v. *Team Worldwide Corporation*, IPR2019-00245, (Nov. 12, 2018), 29 pgs.
"Exhibit 1015: U.S. Pat. No. 5,003,654", *Intex Recreation Corp.* v. *Team Worldwide Corporation*, IPR2019-00245, (Nov. 12, 2018), 35 pgs.
"Exhibit 1015: U.S. Pat. No. 5,003,654", *Intex Recreation Corp.* v. *Team Worldwide Corporation*, IPR2019-00243, (Nov. 12, 2018), 35 pgs.
"Exhibit 1016: U.S. Pat. No. 6,206,654 B1", *Intex Recreation Corp.* v. *Team Worldwide Corporation*, IPR2019-00243, (Nov. 12, 2018), 8 pgs.
"Exhibit 1016: U.S. Pat. No. 6,206,654 B1", *Intex Recreation Corp.* v. *Team Worldwide Corporation*, IPR2019-00245, (Nov. 12, 2018), 8 pgs.
"Exhibit 1017: U.S. Pat. No. 5,235,713", *Intex Recreation Corp.* v. *Team Worldwide Corporation*, IPR2019-00245, (Nov. 12, 2018), 36 pgs.
"Exhibit 1017: U.S. Pat. No. 5,235,713", *Intex Recreation Corp.* v. *Team Worldwide Corporation*, IPR2019-00243, (Nov. 12, 2018), 36 pgs.
"Exhibit 1018: U.S. Pat. No. 4,945,588", *Intex Recreation Corp.* v. *Team Worldwide Corporation*, IPR2019-00243, (Nov. 12, 2018), 8 pgs.
"Exhibit 1018: U.S. Pat. No. 4,945,588", *Intex Recreation Corp.* v. *Team Worldwide Corporation*, IPR2019-00245, (Nov. 12, 2018), 8 pgs.

(56) References Cited

OTHER PUBLICATIONS

"Exhibit 1019: U.S. Pat. No. 5,020,176", *Intex Recreation Corp.* v. *Team Worldwide Corporation*, IPR2019-00245, (Nov. 12, 2018), 9 pgs.
"Exhibit 1019: U.S. Pat. No. 5,020,176", *Intex Recreation Corp.* v. *Team Worldwide Corporation*, IPR2019-00243, (Nov. 12, 2018), 9 pgs.
"Exhibit 1020: U.S. Pat. No. 5,349,983", *Intex Recreation Corp.* v. *Team Worldwide Corporation*, IPR2019-00243, (Nov. 12, 2018), 16 pgs.
"Exhibit 1020: U.S. Pat. No. 5,349,983", *Intex Recreation Corp.* v. *Team Worldwide Corporation*, IPR2019-00245, (Nov. 12, 2018), 16 pgs.
"Exhibit 1021: U.S. Pat. No. 6,092,249", *Intex Recreation Corp.* v. *Team Worldwide Corporation*, IPR2019-00245, (Nov. 12, 2018), 20 pgs.
"Exhibit 1021: U.S. Pat. No. 6,092,249", *Intex Recreation Corp.* v. *Team Worldwide Corporation*, IPR2019-00243, (Nov. 12, 2018), 20 pgs.
"Exhibit 1022: U.S. Pat. No. 6,698,046 B1", *Intex Recreation Corp.* v. *Team Worldwide Corporation*, IPR2019-00243, (Nov. 12, 2018), 10 pgs.
"Exhibit 1022: U.S. Pat. No. 6,698,046 B1", *Intex Recreation Corp.* v. *Team Worldwide Corporation*, IPR2019-00245, (Nov. 12, 2018), 10 pgs.
"Exhibit 1023: U.S. Pat. No. 7,475,443 B2", *Intex Recreation Corp.* v. *Team Worldwide Corporation*, IPR2019-00245, (Nov. 12, 2018), 30 pgs.
"Exhibit 1023: U.S. Pat. No. 7,475,443 B2", *Intex Recreation Corp.* v. *Team Worldwide Corporation*, IPR2019-00243, (Nov. 12, 2018), 30 pgs.
"Exhibit 1024: US 2008/0109963 A1", *Intex Recreation Corp.* v. *Team Worldwide Corporation*, IPR2019-00243, (Nov. 12, 2018), 21 pgs.
"Exhibit 1024: US 2008/0109963 A1", *Intex Recreation Corp.* v. *Team Worldwide Corporation*, IPR2019-00245, (Nov. 12, 2018), 21 pgs.
"Exhibit 1025: U.S. Pat. No. 5,944,494", *Intex Recreation Corp.* v. *Team Worldwide Corporation*, IPR2019-00245, (Nov. 12, 2018), 16 pgs.
"Exhibit 1025: U.S. Pat. No. 5,944,494", *Intex Recreation Corp.* v. *Team Worldwide Corporation*, IPR2019-00243, (Nov. 12, 2018), 16 pgs.
"Exhibit 1026: CN 1519476 A", *Intex Recreation Corp.* v. *Team Worldwide Corporation*, IPR2019-00243, (Nov. 12, 2018), 23 pgs.
"Exhibit 1026: CN 201010186302.4 A", *Intex Recreation Corp.* v. *Team Worldwide Corporation*, IPR2019-00245, (Nov. 12, 2018), 23 pgs.
"Exhibit 1027: Certified English Translation of CN 1519476 A", *Intex Recreation Corp.* v. *Team Worldwide Corporation*, IPR2019-00243, (Apr. 24, 2018), 28 pgs.
"Exhibit 1027: Certified English Translation of CN 201010186302.4 A", *Intex Recreation Corp.* v. *Team Worldwide Corporation*, IPR2019-00245, (Nov. 12, 2018), 30 pgs.
"Exhibit 1028: U.S. Pat. No. 4,527,298", *Intex Recreation Corp.* v. *Team Worldwide Corporation*, IPR2019-00243, (Nov. 12, 2018), 10 pgs.
"Exhibit 1029: U.S. Pat. No. 4,862,921", *Intex Recreation Corp.* v. *Team Worldwide Corporation*, IPR2019-00243, (Nov. 12, 2018), 8 pgs.
"Exhibit 1030: U.S. Pat. No. 6,990,700 B2", *Intex Recreation Corp.* v. *Team Worldwide Corporation*, IPR2019-00243, (Nov. 12, 2018), 39 pgs.
"Exhibit 1031: U.S. Pat. No. 6,733,254 B1", *Intex Recreation Corp.* v. *Team Worldwide Corporation*, IPR2019-00243, (Nov. 12, 2018), 8 pgs.
"Exhibit 1032: U.S. Pat. No. 7,588,425 B2", *Intex Recreation Corp.* v. *Team Worldwide Corporation*, IPR2019-00243, (Nov. 12, 2018), 13 pgs.
"Exhibit 1033: U.S. Pat. No. 5,152,319", *Intex Recreation Corp.* v. *Team Worldwide Corporation*, IPR2019-00243, (Nov. 12, 2018), 7 pgs.
"Exhibit 1101: U.S. Pat. No. 8,863,771 B2", *Intex Recreation Corp.* v. *Team Worldwide Corporation*, IPR2019-00244, (Nov. 12, 2018), 15 pgs.
"Exhibit 1102: Expert Declaration of Bernhard Kuchel", *Intex Recreation Corp.* v. *Team Worldwide Corporation*, IPR2019-00244, (Nov. 12, 2018), 89 pgs.
"Exhibit 1103: File History for U.S. Pat. No. 8,863,771 B2", *Intex Recreation Corp.* v. *Team Worldwide Corporation*, IPR2019-00244, (Nov. 12, 2018), 261 pgs.
"Exhibit 1104: U.S. Pat. No. 9,989,979 B2", *Intex Recreation Corp.* v. *Team Worldwide Corporation*, IPR2019-00244, (Nov. 12, 2018), 16 pgs.
"Exhibit 1105: File History for U.S. Pat. No. 9,989,979 B2", *Intex Recreation Corp.* v. *Team Worldwide Corporation*, IPR2019-00244, (Nov. 12, 2018), 365 pgs.
"Exhibit 1106: U.S. Pat. No. 6,721,980 B1", *Intex Recreation Corp.* v. *Team Worldwide Corporation*, IPR2019-00244, (Nov. 12, 2018), 21 pgs.
"Exhibit 1107: U.S. Pat. No. 7,789,194 B2", *Intex Recreation Corp.* v. *Team Worldwide Corporation*, IPR2019-00244, (Nov. 12, 2018), 22 pgs.
"Exhibit 1108: U.S. Pat. No. 5,716,199", *Intex Recreation Corp.* v. *Team Worldwide Corporation*, IPR2019-00244, (Nov. 12, 2018), 9 pgs.
"Exhibit 1109: U.S. Pat. No. 7,434,283 B2", *Intex Recreation Corp.* v. *Team Worldwide Corporation*, IPR2019-00244, (Nov. 12, 2018), 25 pgs.
"Exhibit 1110: U.S. Pat. No. 6,928,681 B1", *Intex Recreation Corp.* v. *Team Worldwide Corporation*, IPR2019-00244, (Nov. 12, 2018), 7 pgs.
"Exhibit 1111: U.S. Pat. No. 4,829,616", *Intex Recreation Corp.* v. *Team Worldwide Corporation*, IPR2019-00244, (Nov. 12, 2018), 24 pgs.
"Exhibit 1112: U.S. Pat. No. 4,224,706", *Intex Recreation Corp.* v. *Team Worldwide Corporation*, IPR2019-00244, (Nov. 12, 2018), 8 pgs.
"Exhibit 1113: U.S. Pat. No. 4,768,249", *Intex Recreation Corp.* v. *Team Worldwide Corporation*, IPR2019-00244, (Nov. 12, 2018), 28 pgs.
"Exhibit 1114: U.S. Pat. No. 5,509,154", *Intex Recreation Corp.* v. *Team Worldwide Corporation*, IPR2019-00244, (Nov. 12, 2018), 29 pgs.
"Exhibit 1115: U.S. Pat. No. 5,003,654", *Intex Recreation Corp.* v. *Team Worldwide Corporation*, IPR2019-00244, (Nov. 12, 2018), 35 pgs.
"Exhibit 1116: U.S. Pat. No. 6,206,654 B1", *Intex Recreation Corp.* v. *Team Worldwide Corporation*, IPR2019-00244, (Nov. 12, 2018), 8 pgs.
"Exhibit 1117: U.S. Pat. No. 5,235,713", *Intex Recreation Corp.* v. *Team Worldwide Corporation*, IPR2019-00244, (Nov. 12, 2018), 36 pgs.
"Exhibit 1118: U.S. Pat. No. 4,945,588", *Intex Recreation Corp.* v. *Team Worldwide Corporation*, IPR2019-00244, (Nov. 12, 2018), 8 pgs.
"Exhibit 1119: U.S. Pat. No. 5,020,176", *Intex Recreation Corp.* v. *Team Worldwide Corporation*, IPR2019-00244, (Nov. 12, 2018), 9 pgs.
"Exhibit 1120: U.S. Pat. No. 5,349,983", *Intex Recreation Corp.* v. *Team Worldwide Corporation*, IPR2019-00244, (Nov. 12, 2018), 16 pgs.
"Exhibit 1121: U.S. Pat. No. 6,092,249", *Intex Recreation Corp.* v. *Team Worldwide Corporation*, IPR2019-00244, (Nov. 12, 2018), 20 pgs.
"Exhibit 1122: U.S. Pat. No. 6,698,046 B1", *Intex Recreation Corp.* v. *Team Worldwide Corporation*, IPR2019-00244, (Nov. 12, 2018), 10 pgs.
"Exhibit 1123: U.S. Pat. No. 7,475,443 B2", *Intex Recreation Corp.* v. *Team Worldwide Corporation*, IPR2019-00244, (Nov. 12, 2018), 30 pgs.

(56) References Cited

OTHER PUBLICATIONS

"Exhibit 1124: US 2008/0109963 A1", *Intex Recreation Corp.* v. *Team Worldwide Corporation*, IPR2019-00244, (Nov. 12, 2018), 21 pgs.
"Exhibit 1125: U.S. Pat. No. 5,944,494", *Intex Recreation Corp.* v. *Team Worldwide Corporation*, IPR2019-00244, (Nov. 12, 2018), 16 pgs.
"Judgment", *Team Worldwide Corporation* v. *Intex Recreation Corp.*, Fed Cir. Case No. 20-1975 (Document 37), (Sep. 9, 2021), 1 pg.
"Opinion", *Team Worldwide Corporation* v. *Intex Recreation Corp.*, Fed Cir. Case No. 20-1975 (Document 36), (Sep. 9, 2021), 19 pgs.
"Patent Owner's Preliminary Response", *Intex Recreation Corp.* v. *Team Worldwide Corporation*, IPR2019-00243, (Feb. 20, 2019), 47 pgs.
"Patent Owner's Preliminary Response", *Intex Recreation Corp.* v. *Team Worldwide Corporation*, IPR2019-00244, (Feb. 20, 2019), 49 pgs.
"Patent Owner's Preliminary Response", *Intex Recreation Corp.* v. *Team Worldwide Corporation*, IPR2019-00245, (Mar. 28, 2019), 47 pgs.
"Petition for Inter Partes Review of U.S. Pat. No. 8,863,771", *Intex Recreation Corp.* v. *Team Worldwide Corporation*, IPR2019-00243, (Nov. 12, 2018), 84 pgs.
"Petition for Inter Partes Review of U.S. Pat. No. 8,863,771", *Intex Recreation Corp.* v. *Team Worldwide Corporation*, IPR2019-00244, (Nov. 12, 2018), 85 pgs.
"Petition for Inter Partes Review of U.S. Pat. No. 9,989,979", *Intex Recreation Corp.* v. *Team Worldwide Corporation*, IPR2019-00245, (Nov. 12, 2018), 84 pgs.
"Updated Mandatory Notice of Patent Owner", *Intex Recreation Corp., Bestway (USA) Inc.*, v. *Team Worldwide Corporation*, PGR2019-00015, (Jun. 26, 2020), 5 pgs.

* cited by examiner

INFLATING MODULE FOR USE WITH AN INFLATABLE OBJECT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application is a [Divisional] *Reissue of U.S. patent application Ser. No. 14/474,073, now U.S. Pat. No. 9,989,979, filed Aug. 29, 2014, which claims priority as a continuation* of U.S. patent application Ser. No. 13/112,847, *now U.S. Pat. No. 8,863,771,* filed on May 20, 2011, the entirety of which is hereby incorporated by reference, and claims the benefit of China Patent Application No. CN201010186302.4, filed on May 21, 2010.

FIELD OF THE INVENTION

The present invention relates to an inflating module, and more particularly, to an inflating module used in an inflatable object so as to inflate the inflatable object and provide supplemental air pressure to the inflatable object when the air pressure of the inflatable object is under a predetermined level.

DESCRIPTION OF THE PRIOR ART

Inflatable objects have been extensively used in all kinds of applications, e.g. in hospitals for patients, outdoors for recreations and indoors for comfort. No matter what application and in what site the inflatable object is used, one thing in common for all users is that all the inflatable objects leak eventually, which causes discomfort for the users. To avoid such a situation, the user will have to constantly check the air pressure of the inflatable objects to make sure the inflatable objects provide the required comfort.

While there is a leak in the inflatable object, the user turns on the air pump to increase the air pressure inside the inflatable object and when the air pressure reaches the required level, the user turns off the air pump. This routine may be readily done during the daytime for the illumination is enough to do whatever is necessary. However, during the nighttime, especially when the user is asleep, not only the illumination is seriously insufficient, the user's willingness to undergo a troubleshooting process is also extremely low.

To avoid the inconvenience caused by the leak of the inflatable object, the best policy is that the air pressure of the inflatable object is maintained the entire time when the inflatable object is in use. And to maintain the air pressure of the inflatable object, the best option is to use another air pump to provide additional air pressure to the inflatable object in time when the air pressure of the inflatable object is decreasing. However, manual operation of the air pump to provide additional air pressure to the inflatable object is impractical and not necessary. Besides the noise from the operation of another air pump may sometimes causes sleeping disorders to the people around the air pump.

As a result of the above, it is an objective of the present invention to provide an inflating module to not only inflate the inflatable object, but also automatically provide additional air pressure when the air pressure of the inflatable object is decreasing.

SUMMARY OF THE INVENTION

The primary objective of the present invention is to provide a controlling mechanism for operation of an air pump that is used in an inflatable object. The controlling mechanism includes a valve controlling assembly responsible for open/close operation of a valve, a pressure controlling assembly responsible for sensing pressure difference to selectively activate the operation of the valve and a linkage assembly interactively sandwiched between the valve controlling assembly and the pressure controlling assembly to sense the operation of the pressure controlling assembly and consequently operate the movement of the valve controlling assembly.

In a preferred embodiment of the present invention, another objective of the present invention is that the actuation/deactivation of the air pump is controllable by the valve controlling assembly, the pressure controlling assembly or the linkage.

In a preferred embodiment of the present invention, another objective of the present invention is that the pressure controlling assembly is actuated by resilience force, atmospheric/inflatable object pressure or the combination thereof.

In a preferred embodiment of the present invention, another objective of the present invention is to have an automatic supplemental air pressure providing device in association with the operation of the air pump such that whenever there is a pressure decrease in the inflatable object, without the actuation of the air pump, the supplemental air pressure providing device is able to automatically provide air pressure to the inflatable object to maintain the inflatable object pressure at a predetermined level.

Another objective of the present invention is that the valve controlling assembly is able to select one of air paths for air to flow in/out of the inflatable object.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
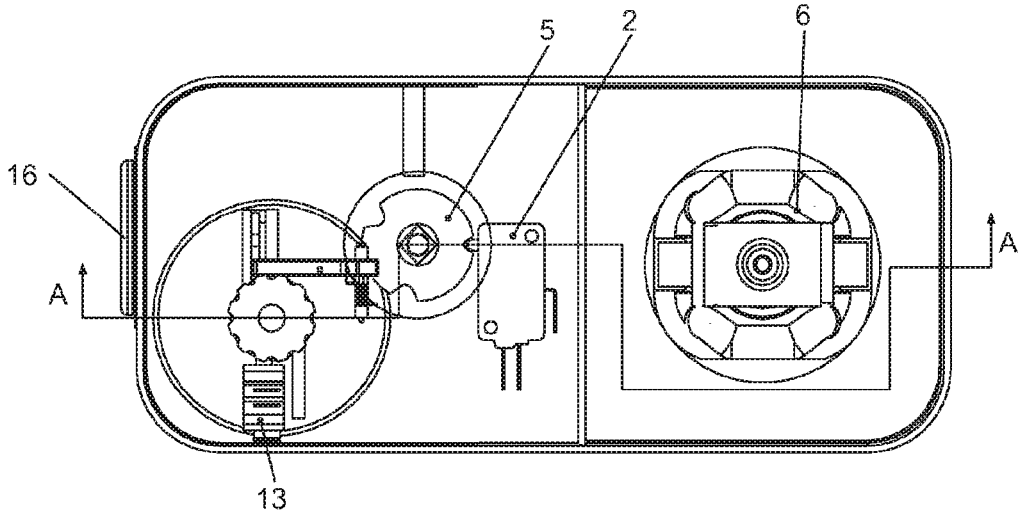
FIG. 1 is a top plan view of the valve controlling assembly of the present invention.
Figure 2A:
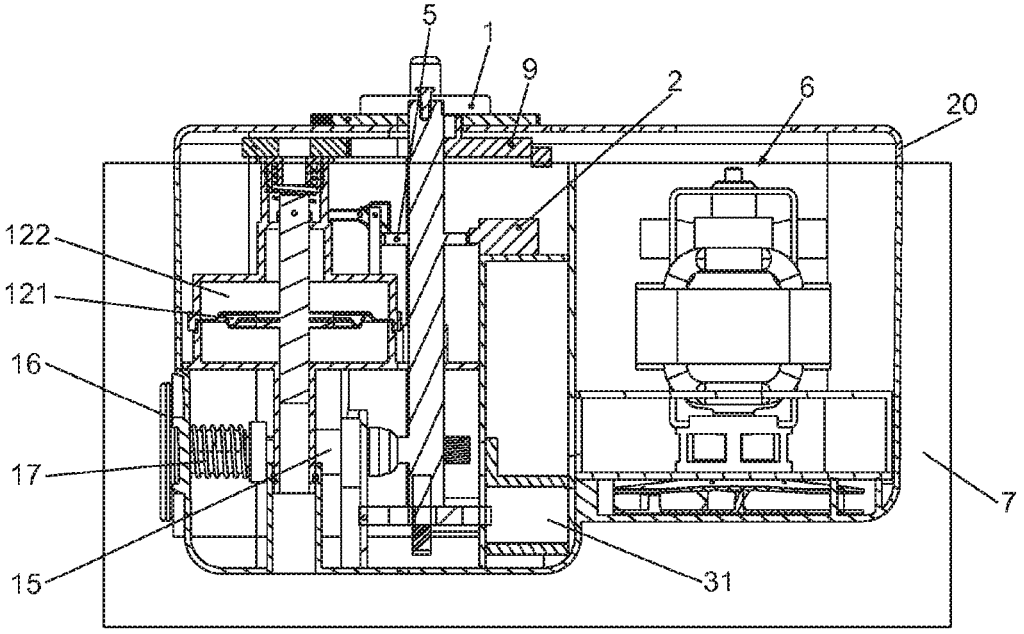
FIG. 2A is a cross sectional view showing the valve controlling assembly in association with the pressure sensing assembly of the present invention.
Figure 2B:
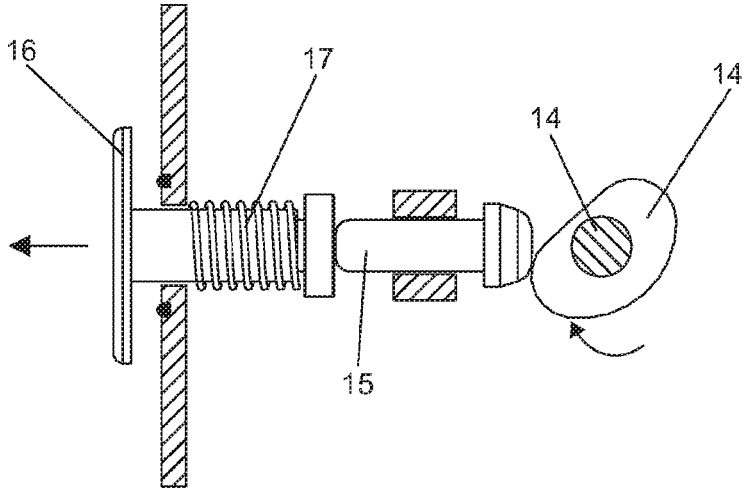
FIG. 2B is a partially cross sectional view showing the interaction between the knob and the valve of the valve controlling assembly of the present invention.

With reference to FIGS. 1, 2A-2B, 3A-3B and FIGS. 4A-4D, an inflating module constructed in accordance with the preferred embodiment of the present invention is shown and has a housing 20 associated with an inflatable object 7. Within the housing 20, a valve controlling assembly for controlling operation of an air pump 6, movement of a valve 16 as well as a path selection mechanism. The valve controlling assembly in accordance with the present invention includes a knob 1 with a shaft 14 integrally extended from the knob 1 and having a cam 140 formed on an outer periphery of the shaft 14 to be responsible for movement of an engagement shaft 15 since one of the mostly protruding ends of the cam 140 is selectively engaged with the engagement shaft 15 and a valve 16 securely formed with a spring abutted shaft 17. From the drawing of FIG. 2B, it is learned that one end of the spring abutted shaft 17 has the valve 16 integrally formed and the other end thereof is securely engaged with a distal end of the engagement shaft 15. As a result of the arrangement of the spring abutted shaft 17, it is noted that when the distal end of the spring abutted shaft 17 is pushed and the spring (shown but not numbered) is contracted, the valve 16 is thus away from the housing 20. Yet, from the illustration of FIGS. 1, 2A and 3A, it is noted that when the knob 1 is rotated so as to simultaneously rotate the shaft 14, the cam 140 is consequently rotated, which leads the movement of the engagement shaft 15.

Eventually the valve 16 is pushed away from the sidewall of the housing 20. A further illustration from FIGS. 1, 2A, 3A 3B and 4B, 4C shows that a contact disk 5 is formed on the outer periphery of the shaft 14 so that the contact disk 5 is selectively rotated in relation to the movement of the knob 1. The contact disk 5 is provided with electrical contacts (not shown) formed thereon to selectively contact a switch 2 with which the air pump 6 is electrically connected. Therefore, it is noted that rotation of the knob 1 is able to control the movement of the valve 16 as well as the operation of the air pump 6.

Aside from the description of the structure as well as the movement of the valve controlling assembly, near the bottom end of the shaft 14, a plurality of threaded-like arcuate wedges 141 are formed on the outer periphery of the shaft 14. A pivot 142 is pivotally formed on a sidewall of the housing 20 and has a ledge 143 integrally formed on a distal end thereof to mate with the arcuate wedges 141. The pivot 142 is further provided with an integrally formed path assembly 3 which has at least one air path formed to selectively communicate the internal space of the inflatable object with the internal space of the air pump 6. In this embodiment of the present invention, it is noted that there is at least one air path 31 formed on the path assembly 3. Therefore, the rotation of the knob 1 leads the rotation of the arcuate wedges 141, which forces the ledge 143 to move either upward or downward to allow the air path 31 to communicate with the internal space of the air pump 6. Therefore, it is also learned that the rotation of the knob 1 can also determine the path of air flow, i.e. into or out of the inflatable object.

From the illustration of FIGS. 3A, 3B, 4A-4D, as an example of the operation of the path selection mechanism, it is learned that when the knob 1 is rotated to activate the operation of the air pump 6 as well as the movement of the valve 16, the arcuate wedges 141 are also rotated. As the ledge 143 is mated with the arcuate wedges 141, the ledge 141 is moved, which ultimately leads the pivot 142 to move. Because the pivot 142 is integrally formed with the path assembly 3, movement of the pivot 142 moves the path assembly 3, up and down in this embodiment such that a predetermined air path is decided when turning the knob 1 clockwise or counterclockwise.

Figure 3A:
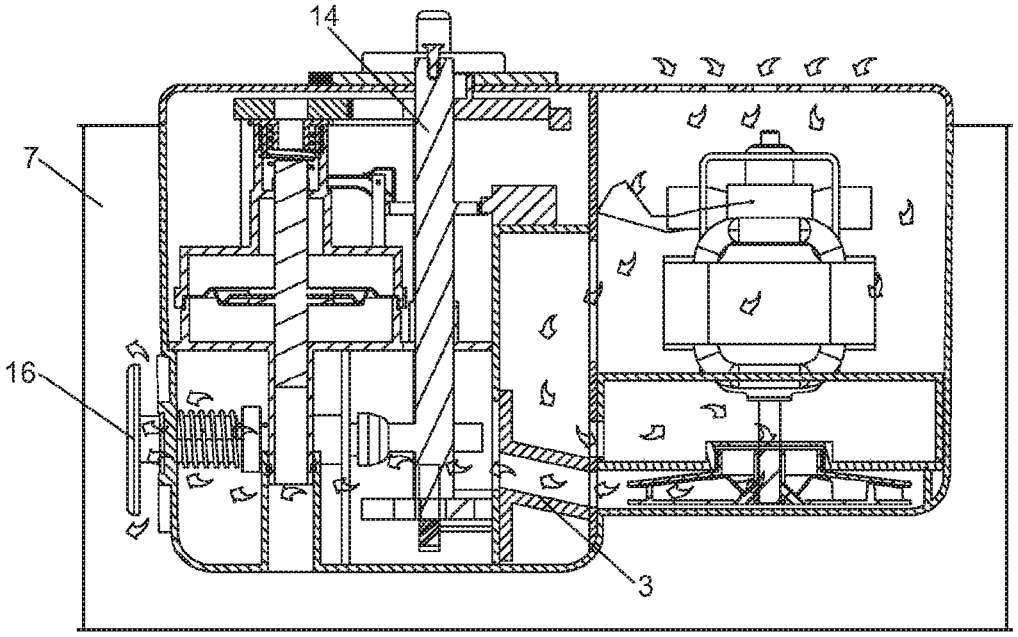
FIG. 3A is a cross sectional view showing the operation of the valve controlling assembly consequently leads the open of an inflow path to allow air outside the inflatable object to flow into the inflatable object.
Figure 3B:
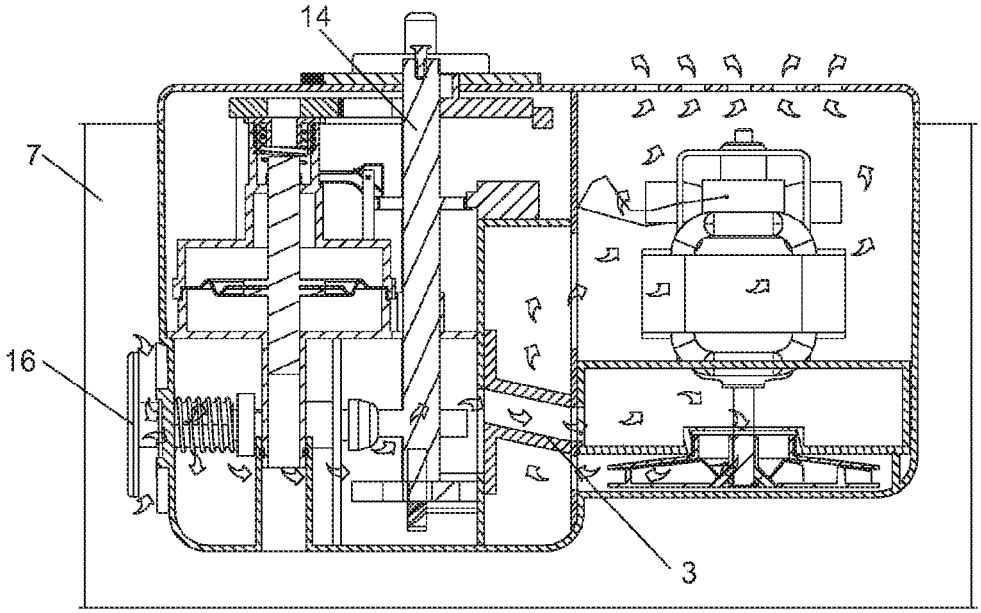
FIG. 3B is a cross sectional view showing the operation of the valve controlling assembly consequently leads the open of an outflow path to allow air inside the inflatable object to flow out of the inflatable object.
Figure 4A:
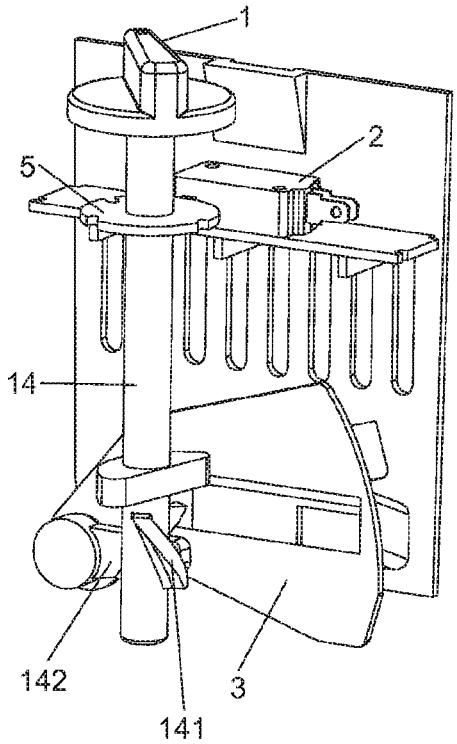
FIG. 4A is a perspective view showing the structure of a portion of the valve controlling assembly of the present invention.
Figure 4B:
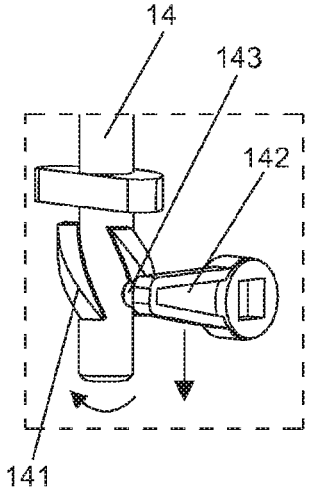
FIG. 4B is a perspective view showing the structure of another portion of the valve controlling assembly of the present invention.
Figure 4C:
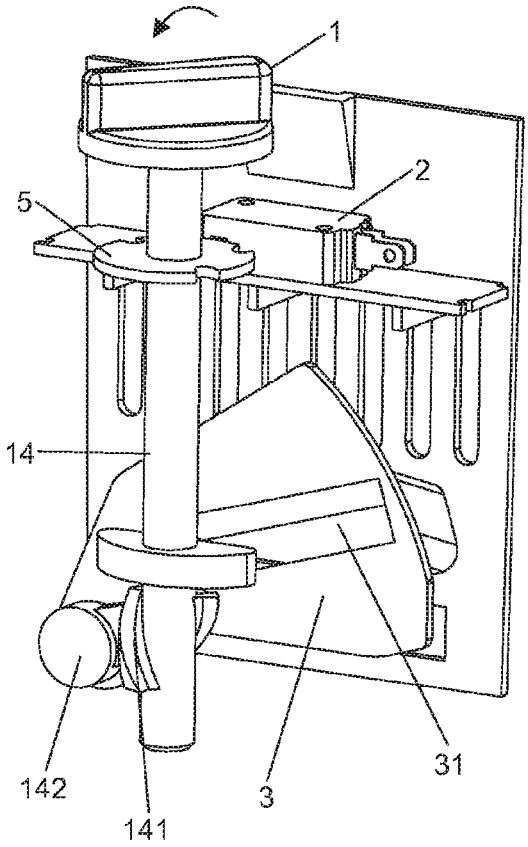
FIG. 4C is a perspective view showing the consequence of the rotation of the knob of the valve controlling assembly of the present invention.
Figure 4D:
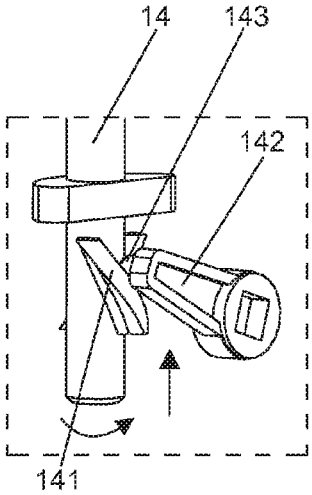
FIG. 4D is still a perspective view showing the consequence of the rotation of the knob of the valve controlling assembly of the present invention.
Figure 5:
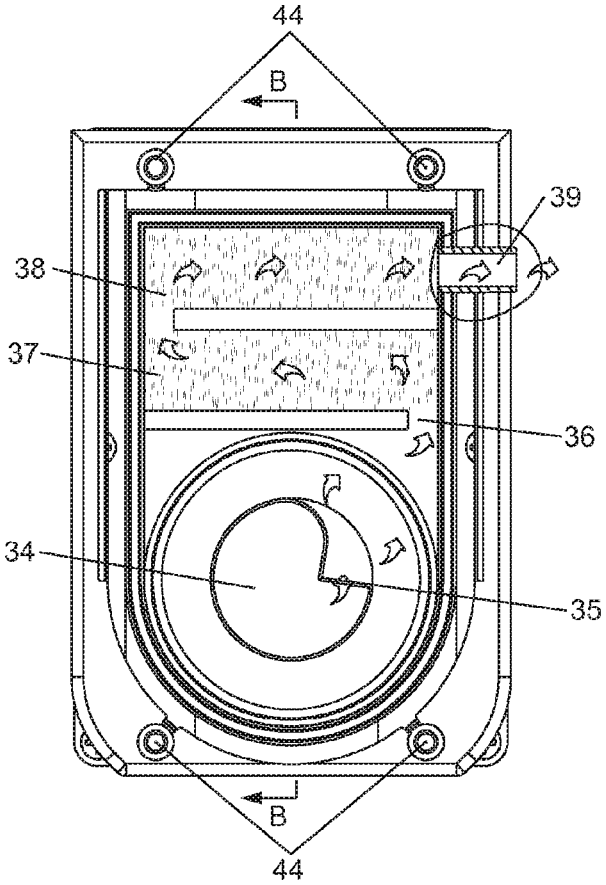
FIG. 5 is a plan view showing the internal structure of the supplemental air pressure providing device of the present invention.

As described, the rotation of the knob 1 can be clockwise or counterclockwise and because of the provision of the contact disk 5 on the shaft 14, the air pump 6 can be activated to provide air flow into or out of the inflatable object, as can best be seen from FIGS. 3A and 3B.

With reference to FIGS. 5-11, it is noted that the automatic supplemental air pressure providing device of one preferred embodiment of the present invention has an outer housing 43 with a first inlet 21. Inside the outer housing 43, an inner housing 23 is integrally formed and has a second inlet 22, a nozzle 39 and a first air chamber 46 defined inside the inner housing 23. The first air chamber 46 is composed of a casing 25 having an inlet 24 and an outlet 29, an oscillator 42 and an air blower 50 operatably connected to the oscillator 42 to provide supplemental air pressure to the inflatable object when needed. The air blower 50 includes a metal housing 47 and a rubber cap 48 securely fixed inside the metal housing 47. A first check valve 26 and a second check valve 27 are provided inside the rubber cap 48 to allow air to sequentially flow through the first check valve 26 and the second check valve 27. The air chamber 46 also has a absorbent (such as a cotton silencer) 28 provided therein to keep the noise caused by the operation of the air blower 50 as low as possible. It is reasonable to assume that the activation of the air pump 6 in the preferred embodiment can also activate the operation of the automatic supplemental air pressure providing device in a standby mode. After the supplemental air pressure providing device is in a standby mode, a pressure controlling assembly 121/122 as described starts monitoring air pressure in the inflatable object. Once the air pressure inside the inflatable object is below a predetermined range, the supplemental air pressure providing device will then automatically provide air pressure to the inflatable object to always maintain the air pressure of the inflatable object within a predetermined range.

Figure 12:
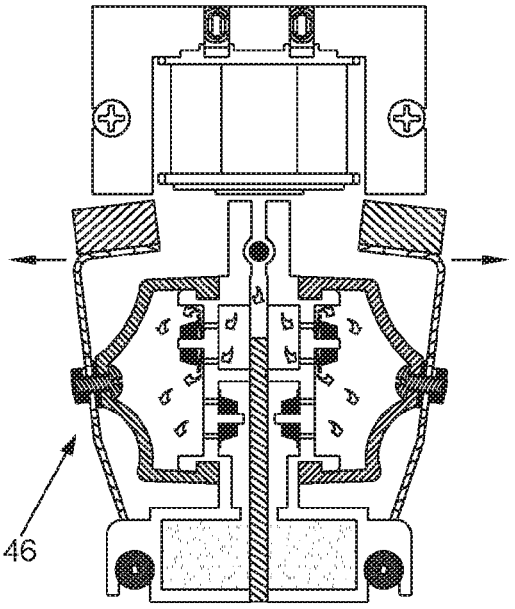
FIG. 12 is a schematic cross sectional view showing the operation of the supplemental air pressure providing device of the present invention.
Figure 13:
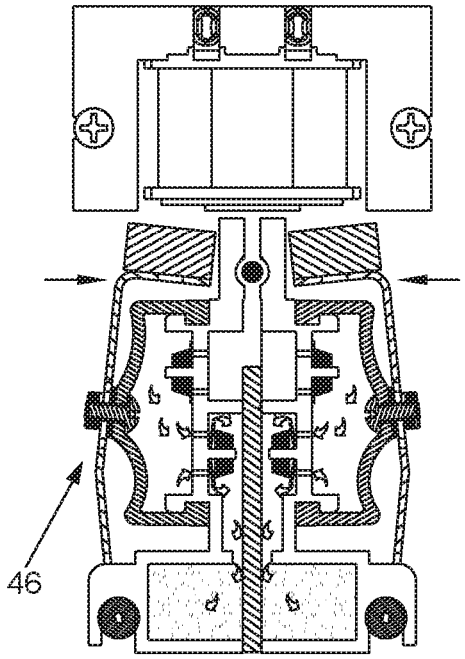
FIG. 13 is still another schematic cross sectional view showing the operation of the supplemental air pressure providing device in a different state.

The operational sequence of the automatic supplemental air pressure providing device of a preferred embodiment of the present invention is that after the oscillator 42 is activated electrically, magnets provided on top of the metal casing 47 will be moved by the activated oscillator 42. As the magnets (not numbered) are securely provided on an outer periphery of the metal casing 47, movement of the magnets drives the metal casing 47 to move simultaneously. Movement of the metal casing leads the rubber cap 48 to move like a bellow, which drives air sucked in from ambient to flow through the first check valve 26, the second check valve 27, the absorbent 28 and the outlet 29. Once the air flow is out of the outlet 29, it is flowing into the second chamber 31, as shown in FIGS. 12 and 13.

Figure 6:
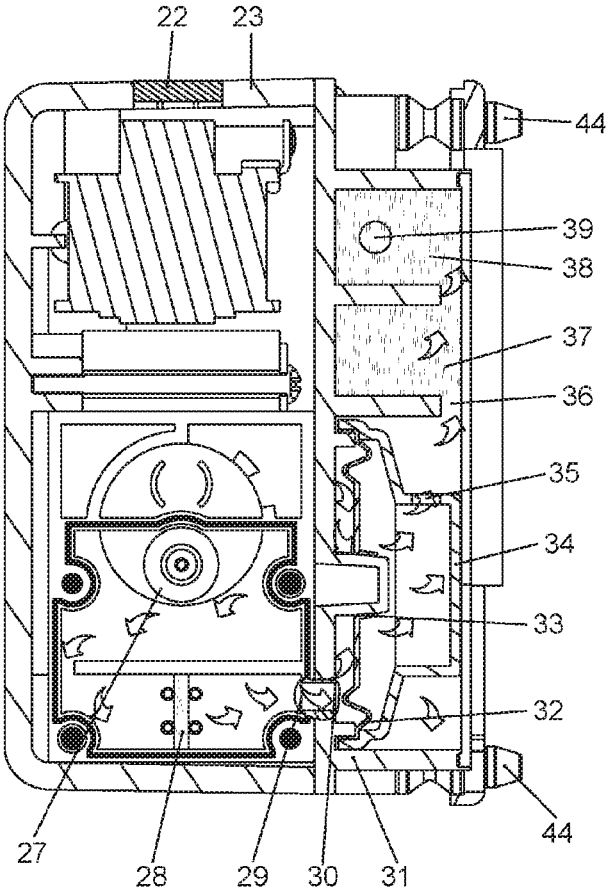
FIG. 6 is a cross sectional view from line B-B of FIG. 5.
Figure 7:
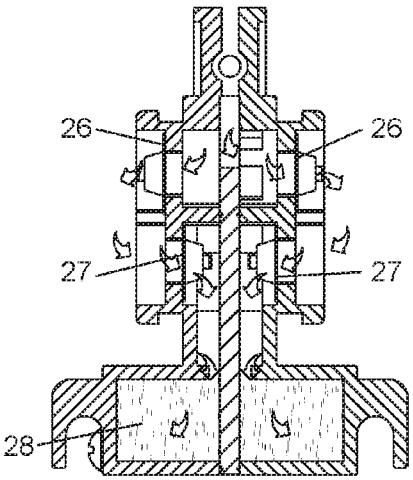
FIG. 7 is a cross sectional view showing the structure of the supplemental air pressure providing device of the present invention.
Figure 8:
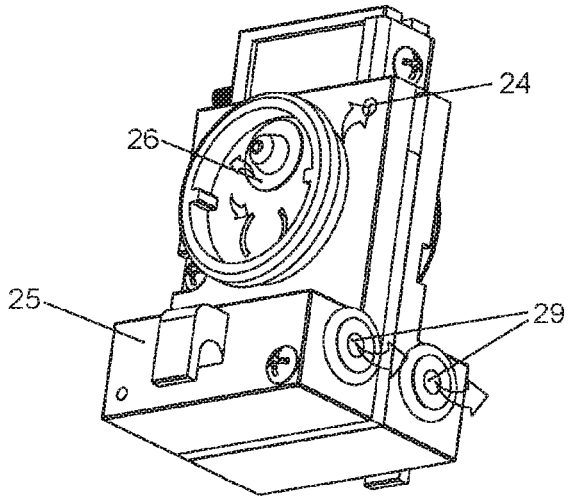
FIG. 8 is a perspective view of the supplemental air pressure providing device of the present invention.
Figure 9:
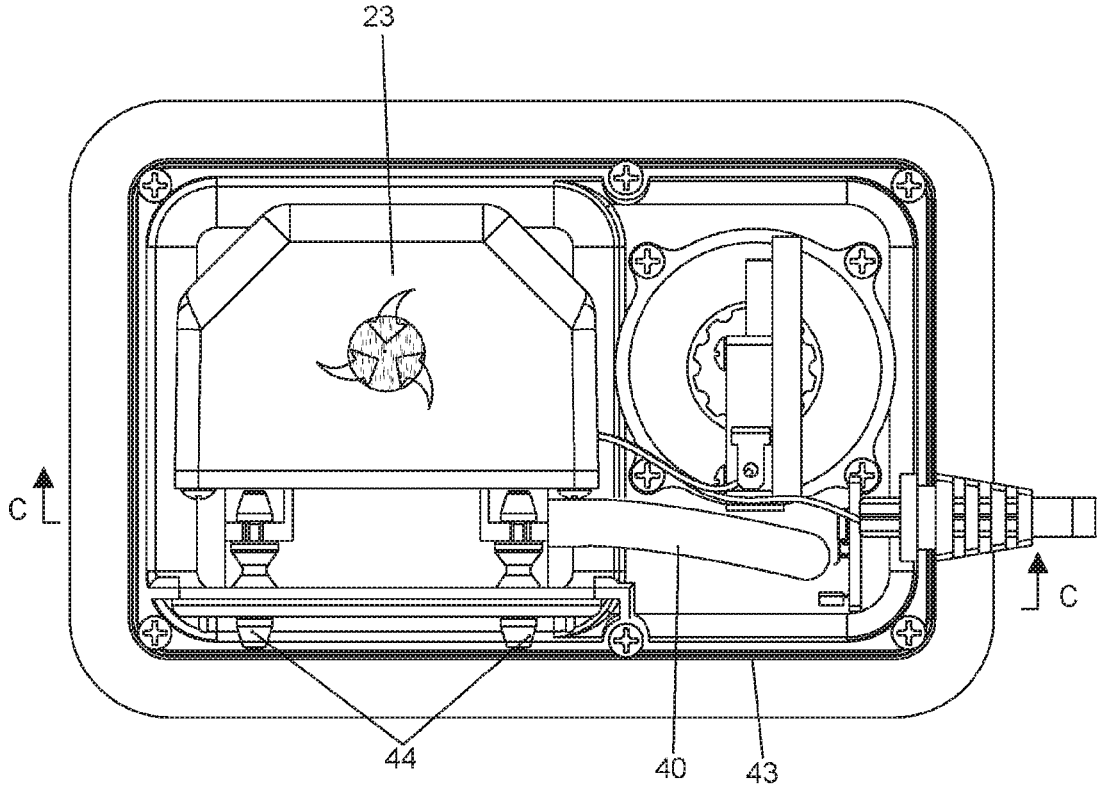
FIG. 9 is a top plan view of the supplemental air pressure providing device of the present invention.
Figure 10:
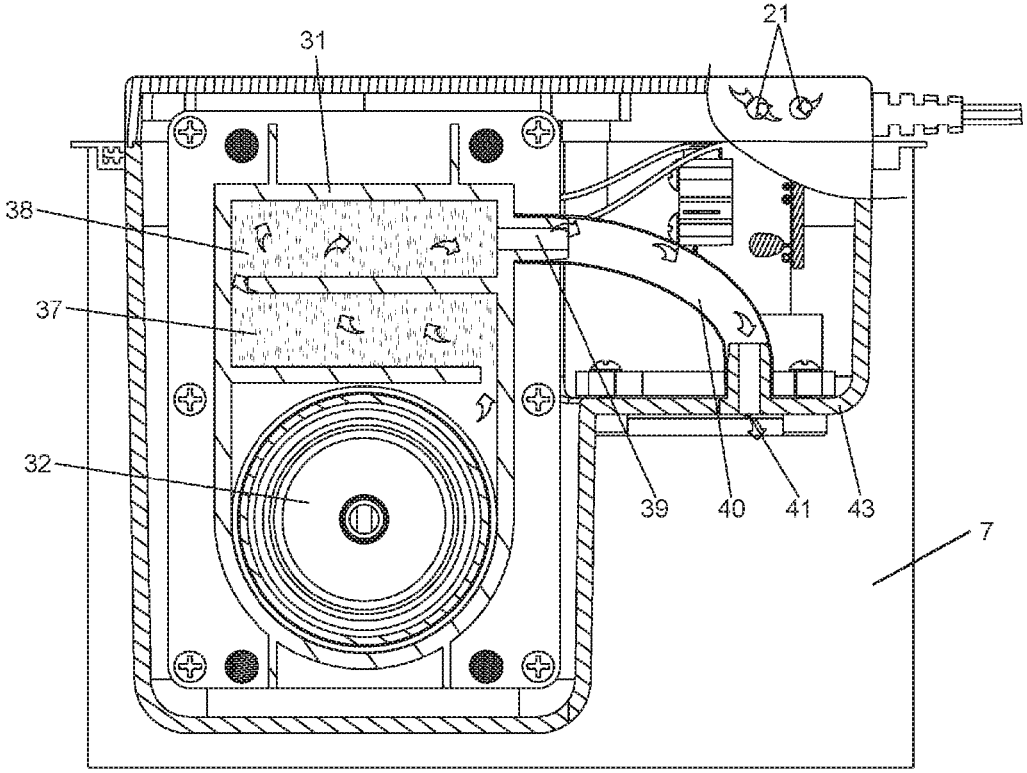
FIG. 10 is a cross sectional view from line C-C of FIG. 9.
Figure 11:
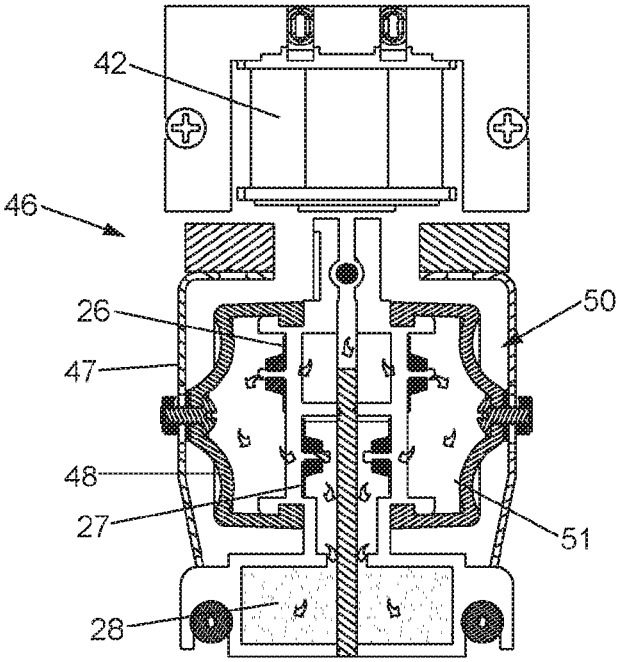
FIG. 11 is cross sectional view showing the internal structure of the supplemental air pressure providing device.

With reference to FIGS. 6 and 10, the inner casing 23 further has a second air chamber 31 with an inlet 30 and the nozzle 39. An air duct 40 is provided between the nozzles 39, 41. To enhance the air flow inside the second air chamber 31, a check valve 32 and further absorbent 37, 38 are provided. The check valve 32 has an outlet 33 and a unidirectional cap 34 with an outlet 35 defined in the unidirectional cap 34. In order to strengthen the ability to lower down the noise, additional absorbent or silencer may also be applied to the inlet 22 and/or the nozzle 41. Between the outer housing 43 and the inner housing 23, noise silencer 44, such as rubber, may be added to harmonize the vibrations.

When the automatic supplemental air pressure providing device of the preferred embodiment of the present invention is in operation, it is learned that air flows from the inlet 21 and enters the outer casing 43. Then the air continues to flow through the second inlet 22 and enters the inner housing 23. Through the inlet 24, the air flows into the casing 25 and passes the first check valve 26 and the second check valve 27 before passing through the space 51 where the air is compressed due to the movement of the metal casing 47 as well as the rubber cap 48. Eventually the air exits from the outlet 29 after passing through the absorbent 28. Then the air flows into the second air chamber 31 and passes through the check valve 32, the outlet 33 and enters the unidirectional cap 34. Finally, the air flows to the chamber 36 from the outlet 35 and reaches absorbent 37, 38 and eventually reaches the inflatable object from the nozzle 39 before passing through the air duct 40. From the structure as described hereinbefore, it is learned that all the vibrations, noise caused by the operation of either or both the air blower and the air pump shall be minimized to reach a goal of providing a quiet and comforting structure to the user.

It is to be noted that although the preferred embodiment of the present invention has been described, other modifications, alterations or minor change to the structure should still be within the scope defined in the claims. As those skilled in the art will readily observe that numerous modifications and alterations of the device and method may be made while retaining the teachings of the invention.

What is claimed is:

[1. An inflating module adapted to an inflatable object comprising an inflatable body, the inflating module used in conjunction with a pump that provides primary air pressure and comprising:

a pressure controlling assembly configured to monitor air pressure in the inflatable object after the inflatable body has been inflated by the pump; and a supplemental air pressure providing device, wherein the pressure controlling assembly is configured to automatically activate the supplemental air pressure providing device when the pressure controlling assembly detects that the air pressure inside the inflatable object decreases below a predetermined threshold after inflation by the pump, and to control the supplemental air pressure providing device to provide supplemental air pressure to the inflatable object so as to maintain the air pressure of the inflatable object within a predetermined range.]

[2. The inflating module as claimed in claim 1, wherein the supplemental air pressure providing device comprises a housing with an air blower received inside the housing to provide supplemental air pressure, an air chamber defined inside the housing, and absorbent disposed in the air chamber such that noise caused by operation of the air blower is minimized by the absorbent.]

[3. The inflating module as claimed in claim 1, wherein the supplemental air pressure providing device further comprises an outer housing with an inner housing integrally formed inside.]

[4. The inflating module as claimed in claim 3, wherein the supplemental air pressure providing device further comprises at least one noise silencer positioned between the outer housing and the inner housing.]

[5. The inflating module as claimed in claim 1, wherein the supplemental air pressure providing device further comprises a nozzle through which air is pumped and absorbent connected to the nozzle for reducing noise inside the nozzle.]

[6. An inflating module adapted to an inflatable object comprising an inflatable body, the inflating module comprising:

a pressure controlling assembly configured to monitor air pressure in the inflatable object after the inflatable body has been inflated; and a supplemental air pressure providing device comprising:

an inner housing comprising a first inlet in communication with ambient air;

a first chamber located in the inner housing, the first chamber comprising a second inlet and a first outlet, the second inlet being in communication with the first inlet;

an oscillator;

an air blower operably connected to the oscillator, the air blower comprising a metal casing and a rubber cap arranged such that activation of the oscillator drives the metal casing to expand and contract, thereby causing the rubber cap to draw air into the second inlet and drive air out of the first outlet;

a second chamber having a third inlet and a second outlet, the third inlet being in communication with the first outlet; and a one-way valve arranged to prevent a back flow of air from the inflatable body through the supplemental air pressure providing device;

wherein the pressure controlling assembly is configured to automatically activate the supplemental air pressure providing device when the pressure controlling assembly detects that the air pressure inside the inflatable object decreases below a predetermined threshold after inflation, and to control the supplemental air pressure providing device to provide supplemental air pressure to the inflatable object so as to maintain the air pressure of the inflatable object within a predetermined range.]

[7. The inflating module as claimed in claim 6, wherein the supplemental air pressure providing device comprises a housing with the air blower received inside the housing, an air chamber defined inside the housing, and absorbent disposed in the air chamber such that noise caused by operation of the air blower is minimized by the absorbent.]

[8. The inflating module as claimed in claim 6, wherein the supplemental air pressure providing device further comprises an outer housing, wherein the inner housing is integrally formed inside the outer housing.]

[9. The inflating module as claimed in claim 8, wherein the supplemental air pressure providing device further comprises at least one noise silencer positioned between the outer housing and the inner housing.]

[10. The inflating module as claimed in claim 6, wherein the supplemental air pressure providing device further comprises a nozzle through which air is pumped and absorbent connected to the nozzle for reducing noise inside the nozzle.]

[11. An inflating module adapted to an inflatable object comprising an inflatable body, the inflating module used in conjunction with a pump that provides primary air pressure and comprising:

a pressure controlling assembly configured to monitor air pressure in the inflatable object after the inflatable body has been inflated by the pump; and a supplemental air pressure providing device comprising:

an inner housing comprising a first inlet in communication with ambient air;

a first chamber located in the inner housing, the first chamber comprising a second inlet and a first outlet, the second inlet being in communication with the first inlet;

an oscillator, a metal casing and a rubber cap arranged such that activation of the oscillator drives the metal casing to expand and contract, thereby causing the rubber cap to draw air into the second inlet and drive air out of the first outlet; and a second chamber having a third inlet and a second outlet, the third inlet being in communication with the first outlet and the second outlet being in communication with the inflatable body;

wherein the pressure controlling assembly is configured to automatically activate the supplemental air pressure providing device to provide supplemental air pressure to the inflatable object when the pressure controlling assembly detects that the air pressure inside the inflatable object decreases below a predetermined threshold after inflation by the pump.]

[12. The inflating module as claimed in claim 11, wherein the pressure controlling assembly is configured to control the supplemental air pressure providing device to maintain the air pressure of the inflatable object within a predetermined range.]

[13. The inflating module as claimed in claim 11, further comprising an outer housing comprising a fourth inlet, the inner housing being received in the outer housing and the first inlet being in communication with ambient air via the fourth inlet.]

[14. The inflating module as claimed in claim 13, wherein the supplemental air pressure providing device further comprises at least one noise silencer positioned between the outer housing and the inner housing.]

[15. The inflating module as claimed in claim 14, wherein the at least one noise silencer comprises rubber.]

[16. The inflating module as claimed in claim 11, wherein a noise absorbent is applied to the first inlet.]

[17. The inflating module as claimed in claim 11, further comprising a third chamber between the second chamber and the inflatable body, the third chamber having a fourth inlet and a third outlet, the fourth inlet being in communication with the second outlet and the third outlet being in communication with the inflatable body, wherein the third chamber comprises a noise absorbent.]

[18. The inflating module as claimed in claim 17, further comprising an air duct, wherein the third outlet comprises a nozzle and is in communication with the inflatable body via the nozzle and air duct.]

*19. A method of controlling inflation of an inflatable object used by a user, the method comprising:*

*using electricity for operating a first electrical pump that is integral to and substantially disposed within the inflatable object so as to inflate the inflatable object, the inflatable object inflated to a first pressure; and*

*after the inflatable object is inflated to the first pressure, maintaining air pressure within the inflatable object within a predetermined range by electrically operating a second electrical pump that is integral to and substantially disposed within the inflatable object, the second electrical pump configured to make low operating noise.*

*20. The method of claim 19, further comprising opening a first valve to allow air to flow between the first electrical pump and the inflatable object.*

*21. The method of claim 19, wherein the second electrical pump is designed to produce low vibration.*

*22. The method of claim 19, wherein the second electrical pump uses an absorbent to reduce noise and vibration.*

*23. The method of claim 19, wherein the second electrical pump uses noise silencers.*

*24. The method of claim 19, further comprising pumping air by electrically activating an oscillator of the second electrical pump.*

*25. The method of claim 19, further comprising using at least one check valve associated with the second electrical pump to prevent the flow of air out of the inflatable object through the second electrical pump.*

*26. The method of claim 19, further comprising using absorbent applied to one or both of an inlet or a nozzle of the second electrical pump to reduce noise from the second electrical pump.*

*27. A method of controlling inflation of an inflatable object used by a user, the method comprising:*

*using electricity for operating a first electrical pump that is integral to and substantially disposed within the inflatable object so as to inflate the inflatable object, the inflatable object inflated to a first pressure; and*

*after the inflatable object is inflated to the first pressure, pumping air into the inflatable object when the air in the inflatable object is decreasing to maintain pressure within a predetermined range by operating a second electrical pump that is integral to and substantially disposed within the inflatable object, the second electrical pump configured to make low operating noise.*

*28. The method of claim 27, further comprising opening a first valve to allow air to flow between the first electrical pump and the inflatable object.*

*29. The method of claim 27, wherein the second electrical pump is designed to produce low vibration.*

*30. The method of claim 27, wherein the second electrical pump uses an absorbent to reduce noise and vibration.*

*31. The method of claim 27, wherein the second electrical pump uses noise silencers.*

*32. The method of claim 27, further comprising pumping air by electrically activating an oscillator of the second electrical pump.*

*33. The method of claim 27, further comprising using at least one check valve associated with the second electrical pump to prevent the flow of air out of the inflatable object through the second electrical pump.*

*34. The method of claim 27, further comprising using absorbent applied to one or both of an inlet or a nozzle of the second electrical pump to reduce noise from the second electrical pump.*

*35. A method of controlling inflation of an inflatable object used by a user, the method comprising:*

*using electricity for operating a first electrical pump that is integral to the inflatable object so as to inflate the inflatable object to a first air pressure through a first valve between the first electrical pump and the inflatable object; and*

*after the inflatable object is inflated to the first air pressure, maintaining air pressure within the inflatable object within a predetermined range by electrically operating a second electrical pump that is integral to the inflatable object, the second electrical pump configured to make low operating noise and vibration.*

*36. The method of claim 35, further comprising using at least one check valve associated with the second electrical pump to prevent the flow of air out of the inflatable object through the second electrical pump.*

*37. The method of claim 36, further comprising using absorbent applied to one or both of an inlet or a nozzle of the second electrical pump to reduce noise from the second electrical pump.*

* * * * *